US012585580B2

(12) United States Patent
Zhang et al.

(10) Patent No.: US 12,585,580 B2
(45) Date of Patent: Mar. 24, 2026

(54) TECHNIQUES FOR A FRAGMENT CURSOR

(71) Applicant: Micron Technology, Inc., Boise, ID (US)

(72) Inventors: Xu Zhang, Shanghai (CN); Jonathan S. Parry, Boise, ID (US); Zhen Gu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 134 days.

(21) Appl. No.: 17/633,523

(22) PCT Filed: Mar. 19, 2021

(86) PCT No.: PCT/CN2021/081757
§ 371 (c)(1),
(2) Date: Feb. 7, 2022

(87) PCT Pub. No.: WO2022/193271
PCT Pub. Date: Sep. 22, 2022

(65) Prior Publication Data
US 2023/0359551 A1 Nov. 9, 2023

(51) Int. Cl.
*G06F 12/02* (2006.01)
*G06F 12/0882* (2016.01)
*G06F 13/16* (2006.01)

(52) U.S. Cl.
CPC ...... *G06F 12/0246* (2013.01); *G06F 12/0882* (2013.01); *G06F 13/1668* (2013.01)

(58) Field of Classification Search
CPC .................................................. G06F 12/0246
See application file for complete search history.

(56) References Cited

U.S. PATENT DOCUMENTS 8,443,167 B1 5/2013 Fallone et al.
9,092,305 B1 * 7/2015 Blott ......................... G06F 3/06
(Continued)

FOREIGN PATENT DOCUMENTS

CN 109271614 A 1/2019
CN 110543495 A 12/2019

OTHER PUBLICATIONS

ISA/KR, International Search Report and Written Opinion of the International Searching Authority, Int'l Appl. No. PCT/CN2021/081757, Dec. 15, 2021, Korean Intellectual Property Office, Seo-gu, Daejeon, Republic of Korea, 9pgs.

*Primary Examiner* — Hosain T Alam
*Assistant Examiner* — Nicholas A. Paperno
(74) *Attorney, Agent, or Firm* — Holland & Hart LLP

(57) ABSTRACT

Methods, systems, and devices for techniques for a fragment cursor are described. A memory system may receive one or more write commands, each write command corresponding to a data fragment. The memory device may store the data fragments to a cursor (e.g., a fragment cursor) in a cache upon receiving the write commands, the cursor configured to store data fragments with a size less than a fragment size threshold (e.g., a page). The memory system may detect a memory management operation (e.g., power down, cache synchronization, data relocation, etc.) and write the cached data fragments to a block of memory cells of a memory device using the cursor. In some examples, the cursor may have a different associated mapping unit than other cursors of the memory system.

16 Claims, 4 Drawing Sheets

(56)  References Cited

U.S. PATENT DOCUMENTS

| 2009/0327624 | A1* | 12/2009 | Tamura | G06F 11/1435 |
| | | | | 711/158 |
| 2016/0268000 | A1* | 9/2016 | Thompson | G11C 16/20 |
| 2018/0074744 | A1 | 3/2018 | Kazi et al. | |
| 2020/0073795 | A1* | 3/2020 | Asano | G06F 3/0656 |
| 2021/0064542 | A1* | 3/2021 | Jang | G06F 3/061 |

* cited by examiner

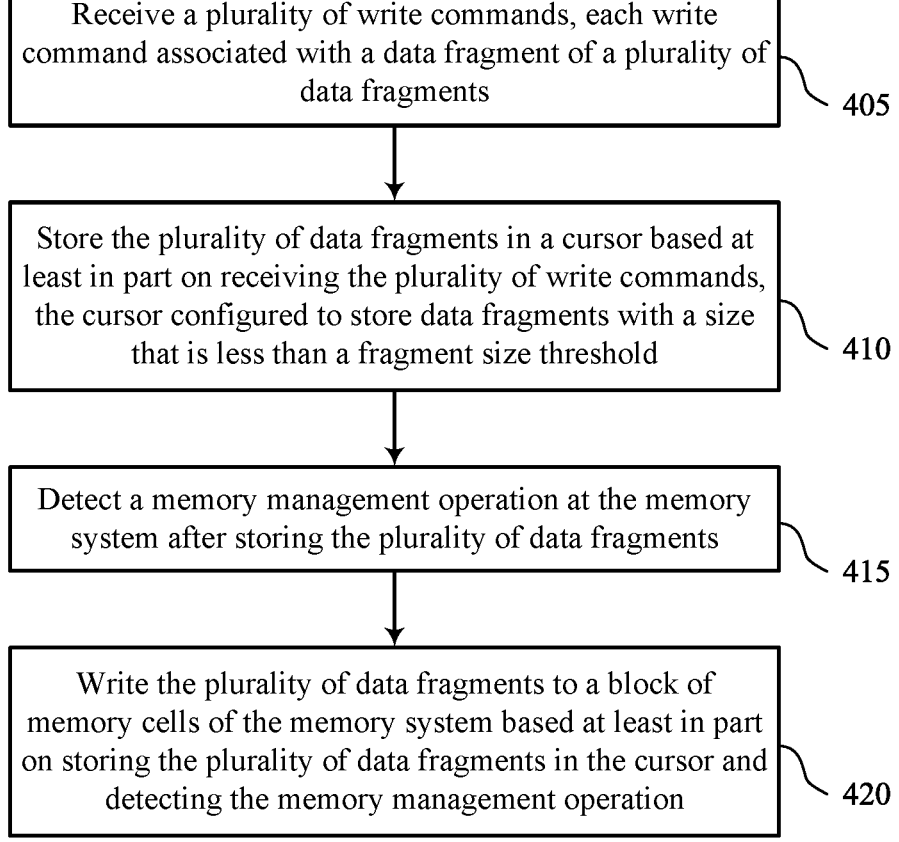

Receive a plurality of write commands, each write command associated with a data fragment of a plurality of data fragments

405

Store the plurality of data fragments in a cursor based at least in part on receiving the plurality of write commands, the cursor configured to store data fragments with a size that is less than a fragment size threshold

410

Detect a memory management operation at the memory system after storing the plurality of data fragments

415

Write the plurality of data fragments to a block of memory cells of the memory system based at least in part on storing the plurality of data fragments in the cursor and detecting the memory management operation

TECHNIQUES FOR A FRAGMENT CURSOR

CROSS REFERENCE

The present Application for Patent is a 371 national phase filing of International Patent Application No. PCT/CN2021/081757 by Zhang et al., entitled "TECHNIQUES FOR A FRAGMENT CURSOR," filed Mar. 19, 2021, assigned to the assignee hereof, and expressly incorporated by reference herein.

FIELD OF TECHNOLOGY

The following relates generally to one or more systems for memory and more specifically to techniques for a fragment cursor.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 4 shows a flowchart illustrating a method or methods that support techniques for a fragment cursor in accordance with examples as disclosed herein.

DETAILED DESCRIPTION

Figure 1:
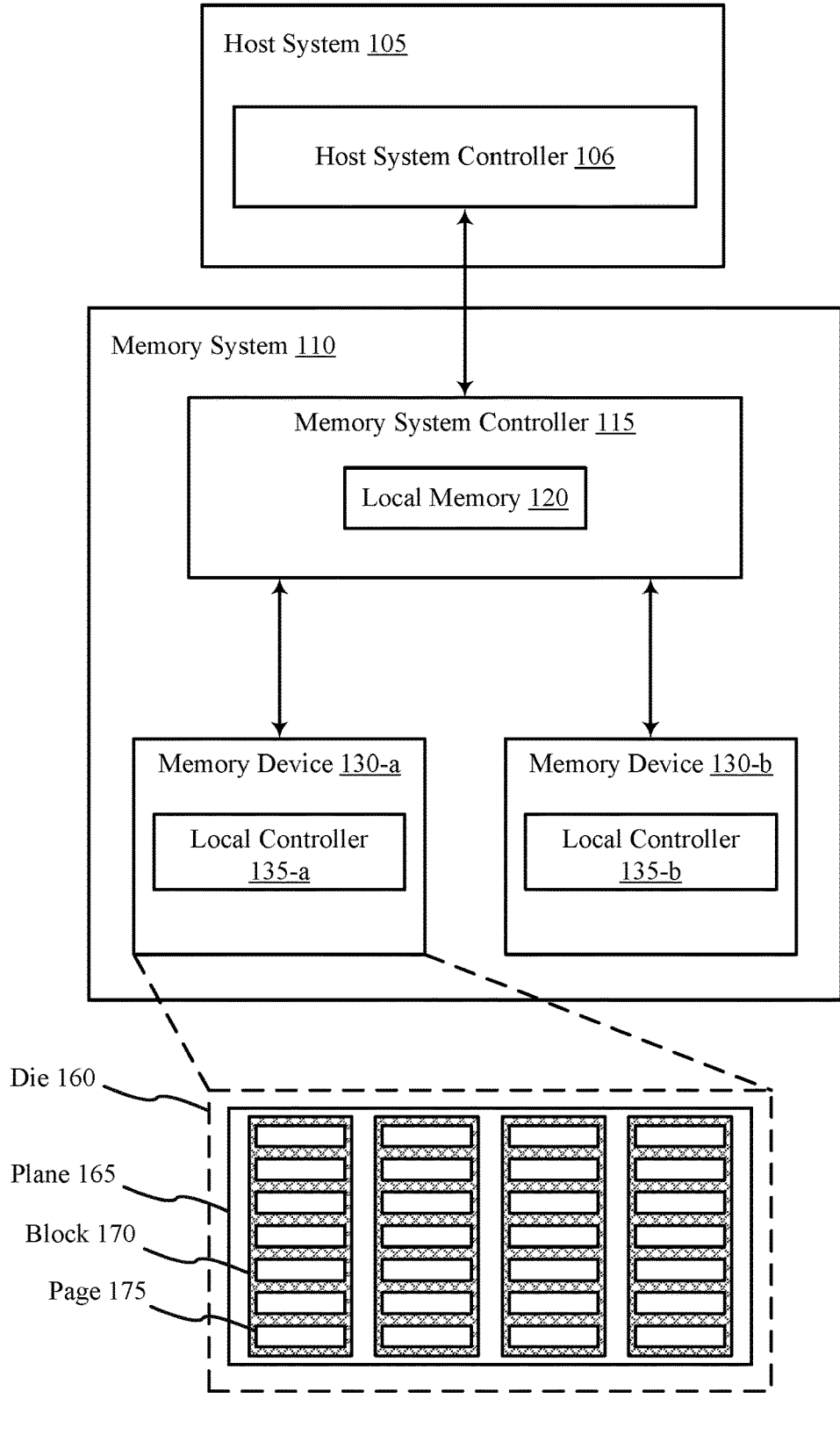
FIG. 1 illustrates an example of a system that supports techniques for a fragment cursor in accordance with examples as disclosed herein.

Memory devices of a memory system may store data at a corresponding physical address, where a physical address may identify a physical location of a corresponding memory cell (e.g., or a page of memory cells) within a memory device. The physical location of data within the memory device may change over time due to the memory device accommodating the writing of additional data, maintenance operations performed by the memory device (e.g., garbage collection operations), or for other reasons. A host system coupled with the memory system may reference data (e.g., if issuing read, write, or other commands associated with the data) using logical addresses (e.g., logical block addresses (LBAs), virtual addresses, system addresses, or other logical addresses), and the memory device (e.g., or the memory system) may generate and maintain a mapping between the logical addresses used in the communications with the host system and the physical addresses of the memory cells at which the data is stored, which may support the memory device changing the physical addresses over time.

A host system may send write commands to a memory system that request that the memory system write information to memory cells. A memory system may not be capable of writing the information immediately upon receipt of the write command. In some cases, write commands (or information associated with write commands) may be submitted one by one to a cursor of a memory system to perform associated write operations. The cursor may be included in a media translation layer (e.g., a Flash Translation Layer) and may be used to abstract the data layout and write ordering of the media. For example, the cursor may be used to identify what memory cells may be used to store information associated with a write command and ensure that data is written in memory cells as indicated in a write command. In some cases, the cursor may initially write the data to a local memory device (e.g., a single level cell (SLC) block, multi-level cell (MLC) block that includes two levels, a triple level cell (TLC) block, a quad-level cell (QLC) block, or the like). In some examples, the cursor may be a TLC cursor. The memory system may receive one or more write commands and the TLC cursor may write the relevant data to one or more TLC block. If the TLC cursor writes an amount of data (e.g., a TLC page) to the one or more TLC blocks, the TLC cursor may write the TLC data to the memory cells in the memory device as indicated in the one or more write commands.

In some examples, the host system may initiate a memory management operation (e.g., a power off sequence, a cache synchronization operation, a data relocation operation, etc.). In response to the memory management operation, the memory system may be configured to write cached data to the memory device (e.g., regardless of the amount of data stored at a local memory device). A cursor may write the cached data to the memory device according to a mapping unit configured for the cursor. In some examples, the cursor may be configured with a page-based mapping unit such that the cursor may write a page of data in a write operation. That is, the cursor may write the cached data along with a set of dummy data (e.g., random logic states) to the memory device, where the combination of the cached data and the set of dummy data may fill a page. However, if the local memory device includes a small amount of data (e.g., compared to the size of a page), writing the set of dummy data to fill the page may reduce efficiency or consume additional storage at the memory device.

Techniques, systems, and devices are described herein for increasing performance and reducing latency using a cursor configured for writing small amounts of data, which may be referred to as a fragment cursor. Compared to other cursors at a memory device, the fragment cursor may be configured with a relatively small mapping unit. For example, the fragment cursor may be configured with a subpage based mapping unit, where, in response to a memory management operation, the fragment cursor may write cached data to a portion of a page to the memory device. As such, the fragment cursor may enable the memory system to write the cached data to the memory device with less dummy data, which may reduce computing resource use and improve system efficiency, among other benefits.

Figure 2:
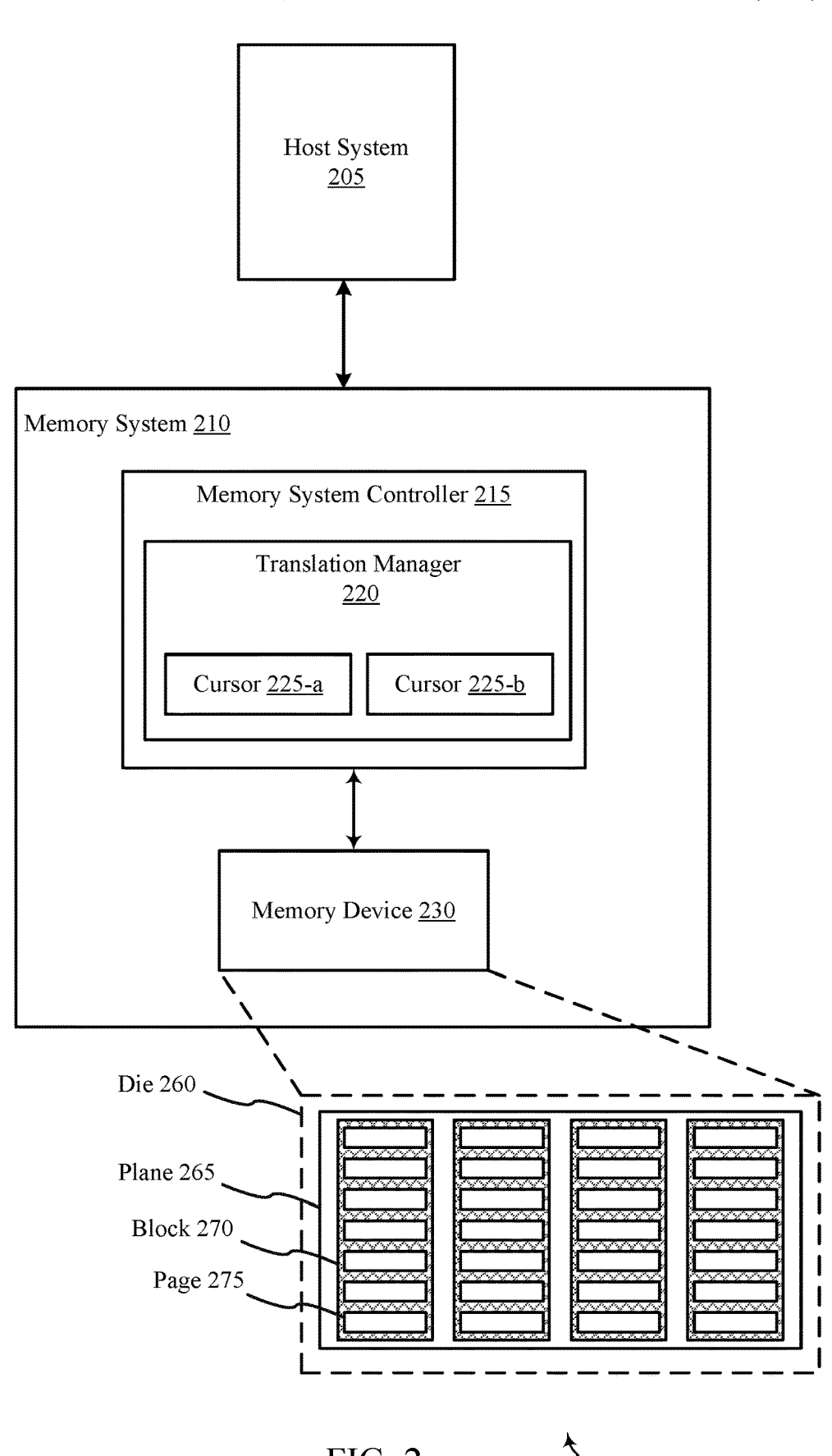
FIG. 2 illustrates an example of a system that supports techniques for a fragment cursor in accordance with examples as disclosed herein.

Features of the disclosure are initially described in the context of systems, devices, and circuits with reference to FIGS. 1-2. These and other features of the disclosure are further illustrated by and described in the context of an apparatus diagram and flowchart that relate to techniques for a fragment cursor with reference to FIGS. 3-4.

FIG. 1 illustrates an example of a system 100 that supports techniques for a fragment cursor in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105).

Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally or alternatively, a NAND memory device 130 may include memory cells configured to each store multiple bits of information, which may be examples of MLCs if configured to each store two bits of information, TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, a NAND memory device 130 may include static or dynamic SLC blocks 170. A static SLC block 170 may include memory cells used solely for SLC storage, where each memory cell of a static SLC block 170 may store one bit of information. A dynamic SLC block 170 may include memory cells used for a mix of SLC storage and MLC, TLC, or QLC storage, where each memory cell of a dynamic SLC block 170 may store one, two, three, or four bits of information. In some examples, information stored in static SLC blocks 170 may have a greater endurance than information stored in dynamic SLC blocks 170.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for a fragment cursor. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, the memory system controller 115 may receive one or more write commands from the host system 105 (e.g., from the host system controller 106). Upon receiving the write commands, the memory system controller 115 may store data (e.g., data fragments) associated with the write commands to a cursor in a cache (e.g., the local memory 120) local to the memory system controller 115 upon receiving the one or more write commands. In some cases, the local cache may be associated with storing data to a memory device 130. In some cases, the memory system controller 115 may write the data from the cursor to a page 175, a block 170, or the like, in the memory device 130.

In some cases, the memory system controller 115 may be configured with more than one cursor. For instance, the memory system controller 115 may include both a cursor and a fragment cursor. The memory system controller 115 may write one or more data fragments to the fragment cursor. The fragment cursor may be configured to store data fragments with a size that is less than a fragment size threshold, where the fragment size threshold may correspond to a size of a page 175, a block 170, a portion of a page 170, or another portion of a die 160. In some examples, the fragment cursor may be configured to store the data fragments in a static SLC block 170 or a dynamic SLC block 170, for example based on an endurance requirement for the data fragments or based on provisioning and partitioning of block types and block reserves at the memory device 130.

In some cases, the memory system controller 115 may detect a memory management operation at the memory system 110 after receiving one or more write commands, each write command associated with a data fragment. The memory system controller 115 may store the data fragments in the fragment cursor of the local memory 120 in response to receiving the one or more write commands. Upon detecting the memory management operation, the memory system controller 115 may write the data from the fragment cursor to a memory device 130. In some cases, the memory system controller 115 may write dummy data (e.g., random logic states) to the memory device 130 to fill a mapping unit of the fragment cursor not taken up by the data fragments. The mapping unit of the fragment cursor may be smaller than that of the cursor. As such, the memory system controller 115 may write less dummy data to the memory device 130 when using the fragment cursor compared to using the cursor.

In some examples, when writing data to the memory device 130 using the fragment cursor, the memory system controller 115 may not write to multiple dies 160 of the memory device 130 in parallel. Instead, writing data to the memory device 130 using the fragment cursor may allow the memory system controller 115 to write the data to the memory device one level, one die 160, one plane 165, one block 170, one page 175 at a time. Thus, writing data to the memory device 130 using the fragment cursor may decrease computing resource usage and enhance memory operation.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an MNAND system.

FIG. 2 illustrates an example of a system 200 that provides for a fragment cursor in accordance with some examples of the present disclosure. The system 200 may include a memory system 210. The memory system 210 may include a memory system controller 215, a translation manager 220, and a memory device 230. The translation manager 220 may include one or more cursors 225 (e.g., a cursor 225-a and a cursor 225-b). The system 200 may also include a host system 205.

The memory system 210 may receive, from the host system 205, commands for transfer units (e.g., blocks, pages, etc.) of the memory system 210. The cursors 225 and 226 may be used to abstract the data layout and write ordering of the media. For example, the cursor 225 may be within the translation manager 220 which handles user data in transfer units. The cursor 225 may ensure that data is written in the range of NAND flash memory cells indicated in the command received from the host system 205. For example, a write process may be performed using the cursor 225 to write the transfer units to the memory device 230 of the memory system 210.

In some cases, the memory system controller 215 may generate a list of the transfer units. The list may include pointers between each of the transfer units. In such cases, the list may be an example of a linked list. For example, the pointer may be associated with the transfer unit and indicate the next transfer unit in the linked list of transfer units. The linked list of transfer units may enable the memory system 210 to improve the overall efficiency of the memory system 210 by operating on the transfer units with increased write speeds.

In some examples, the memory system controller 215 may submit the linked list to a write cursor (e.g., the cursor 225-*a*). In such cases, the write cursor may packetize the information to be able to iterate on the linked list for multiple iterations. For example, the cursor 225 may retrieve a transfer unit in the linked list and then retrieve the next transfer unit in the linked list in response to multiple iterations being on the same linked list. The transfer units may be linked to each other regardless of a host command received from the host system 205. In such cases, the links between the transfer units in the linked list are independent of the host command.

In some cases, a memory device 230 may be shared by more than one component of the memory device 210 (e.g., the translation manager 220 or the like). Each component of the firmware may be implemented by one or more processing cores. In some examples, some processing cores may be dedicated to performing the functions of a specific component. For example, a set of cores may be dedicated to performing the functions of the translation manager 220. In some examples, one or more cores may perform functions associated with more than one component of the firmware. The pointers of the linked list may be stored in a memory device 230, where the pointer may indicate a next transfer unit in the linked list. In some cases, the transfer units and the linked list may be stored in the memory device 230. In such cases, the various processing cores associated with each component may access the pointer, the linked list, and the transfer units stored in the memory device 230. Thus, one or more cursors may be used to manage how to write data to the memory device, especially when multiple processing resources are using similar memory resources.

In some cases, the memory system controller 215 may receive one or more write commands from the host system 205. Upon receiving the write commands, the memory system controller 215 may store data (e.g., data fragments) associated with the write commands to a cursor 225 in a cache, such as local memory 120 as described with reference to FIG. 1 (e.g., SRAM), local to the memory system controller 215. In some cases, the local cache may be associated with storing data to the memory device 230. In response to the local cache holding a sufficient amount of data (e.g., corresponding to a page 275, a block 270, etc.), the memory system controller 215 may store the data associated with the one or more write commands to the memory device 230 from the appropriate cursor. For instance, the memory system controller 215 may receive one or more write commands and may store the associated data to a cursor 225 (e.g., an SLC cursor) in the local cache. In some examples, the data may be enough to fill an SLC page 275, an SLC block 270, or the like. As such, translation manager 220 may write the data from cursor 225 to a page 275, a block 270, or the like, in SLC memory cells of the memory device 230.

When writing data to the SLC memory cells of the memory device 230, the memory system controller 215 may write the contents of the cursor 225 to one or more dies 260 (e.g., 4 dies 260) of the SLC in parallel. When writing data to MLC, TLC, or QLC memory cells of the memory device 230, the memory system controller 215 may write the contents of a cursor to the dies 260 on the levels of the memory cells. Writing data to other memory cells of the memory device (e.g., QLC memory cells, MLC memory cells, or the like) may include similar parallel operations.

In some cases, the memory system controller 215 may detect a memory management operation at the memory device 210 after storing an amount of data to a cursor 225-*a* (e.g., a write cursor) of the local cache. The memory management operation may be a power operation (e.g., power down), a cache synchronization operation, a data relocation operation, or a combination thereof. Upon detecting the memory management operation, the memory system controller 215 may write the data from the cursor 225-*a* to the memory device 230. In some examples, the memory system controller 215 may detect the memory management operation when the cursor 225-*a* of the local cache has less data than a fragment size threshold. The fragment size threshold may be a size of a page 275. As such, the memory system controller 215 may write dummy data (e.g., random logic states) to fill the rest of the stored data may be relatively small compared to the size of the dummy data. For instance, the previously stored data may be 4 kilobytes (kB) of data (e.g., a pointer, an attribute, or the like). The cursor 225-*a* may be associated with a page size of 128 KB, 256 KB, or the like. As such, the memory system controller 215 may store a significant amount of dummy data in the cursor 225-*a* compared to the previously stored data, resulting in increased computing resource usage and inefficient memory operation. Another example of a memory management operation may occur when the cursor resources are being utilized fully. A cursor may have an upper threshold of a different quantity of active pages being managed (e.g., four). If the total quantity is at the upper limit and an additional page is desired to be opened in the cursor, the cursor may fill one of the open pages with dummy data and close it to make room for the new page.

In some cases, the memory system controller 215 may include more than one cursor 225. For instance, memory system controller 215 may include a cursor 225-*a* and a cursor 225-*b*. In some cases, the cursor 225-*a* and the cursor 225-*b* may be different types of cursors 225. By way of example, the cursor 225-*a* may be a cursor for a multiple level block (e.g., an MLC cursor, a TLC cursor, a QLC cursor, etc.) and may be stored in a cache (or a portion of a cache) associated with multiple level memory cells of the memory device 230, and the cursor 225-*b* may be an SLC cursor and may be stored in a cache (or a portion of a cache) associated with SLC memory cells of the memory device 230. Additionally or alternatively, the cursor 225-*a* may have a different associated mapping unit than the cursor 225-*b*. The translation manager 220 may use cursors 225 with different mapping units (e.g., page based, block based, subpage based, etc.) to write different amounts of data to local memory (e.g., the memory device 230). For instance, the cursor 225-*a* may have a mapping unit of one SLC page 275 and the cursor 225-*b* may have a mapping unit of an SLC subpage. The translation manager 220 may thus write data on the scale of an SLC page 275 to the SLC memory cells of the memory device 230 using the cursor 225-*a* and data on the scale of a subpage to the SLC memory cells of the memory device 230 using the cursor 225-*b*.

In some cases, the memory system controller 215 may write one or more data fragments to a fragment cursor (e.g., the cursor 225-*b*). The cursor 225-*b* may be configured to store data fragments with a size that is less than the fragment size threshold. For instance, cursor 225-*b* may have a subpage based mapping unit. When the memory system controller 215 detects a memory management operation, the memory system controller 215 may write less (if any) dummy data to the memory device 230 using the cursor 225-*b* compared to using the cursor 225-*a*. By way of example, the memory system controller 215 may detect a memory management operation at the memory system 210 after receiving one or more write commands, each write command associated with a data fragment. As such, the memory system controller 215 may store the data fragments in the cursor 225-*b* of the local cache in response to receiving the one or more write commands. In some cases, the memory system controller 215 may store the data fragments in the cursor 225-*b* if the data fragments have a size less than the fragment size threshold. Upon detecting a memory management operation, the memory system controller 215 may write the data from the cursor 225-*b* to the memory device 230. That is, the memory management operation may trigger the memory system controller 215 to write to the memory device 230 using the cursor 225-*b*. In some examples, writing data to the memory device 230 may be in response to storing the data in the cursor 225-*b*.

In some cases, the memory system controller 215 may write dummy data (e.g., random logic states) to the memory device 230 to fill the rest of the mapping unit of the cursor 225-*b* not taken up by the data fragments. In some examples, the mapping unit of the cursor 225-*b* may be 8 kB and the data fragments may be 4 kB of data (e.g., a pointer, an attribute, or the like). As such, the memory system controller 215 may write 4 kB of dummy data to the memory device 230, thereby decreasing the amount of dummy data written to the memory device 230 (compared to using the cursor 225-*a*). Additionally or alternatively, the memory system controller 215 may write a partial of a page (e.g., the 4 kB of data) to the memory device 230 instead of writing the dummy data. Moreover, if writing data to the memory device 230 using the cursor 225-*b*, the memory system controller 215 may not write to multiple dies 260 of the memory device 230 in parallel. Rather, writing data to the memory device 230 using the cursor 225-*b* may enable the memory system controller 215 to write the data to the memory device 230 one level, one die 260, one plane 265, one block 270, or one page 275 at a time. Thus, writing data to the memory device 230 using the cursor 225-*b* may decrease computing resource usage and enhance memory operation.

In some cases, the cursor 225-*b* may be a temporary cursor 225. For instance, upon the detection of the memory management operation, the memory system controller 215 may write data to the cursor 225-*b*. That is, the memory management operation may trigger the use of the cursor 225-*b*. Upon completion of the memory management operation (e.g., power on, cache synchronization complete, data relocation complete), the memory system controller 215 may merge the data fragments from the cursor 225-*b* with the cursor 225-*a* and cease to use the cursor 225-*b*. Additionally or alternatively, the memory system controller 215 may merge the data in the cursor 225-*a* with the data fragments in cursor 225-*b* during a garbage collection procedure.

Figure 3:
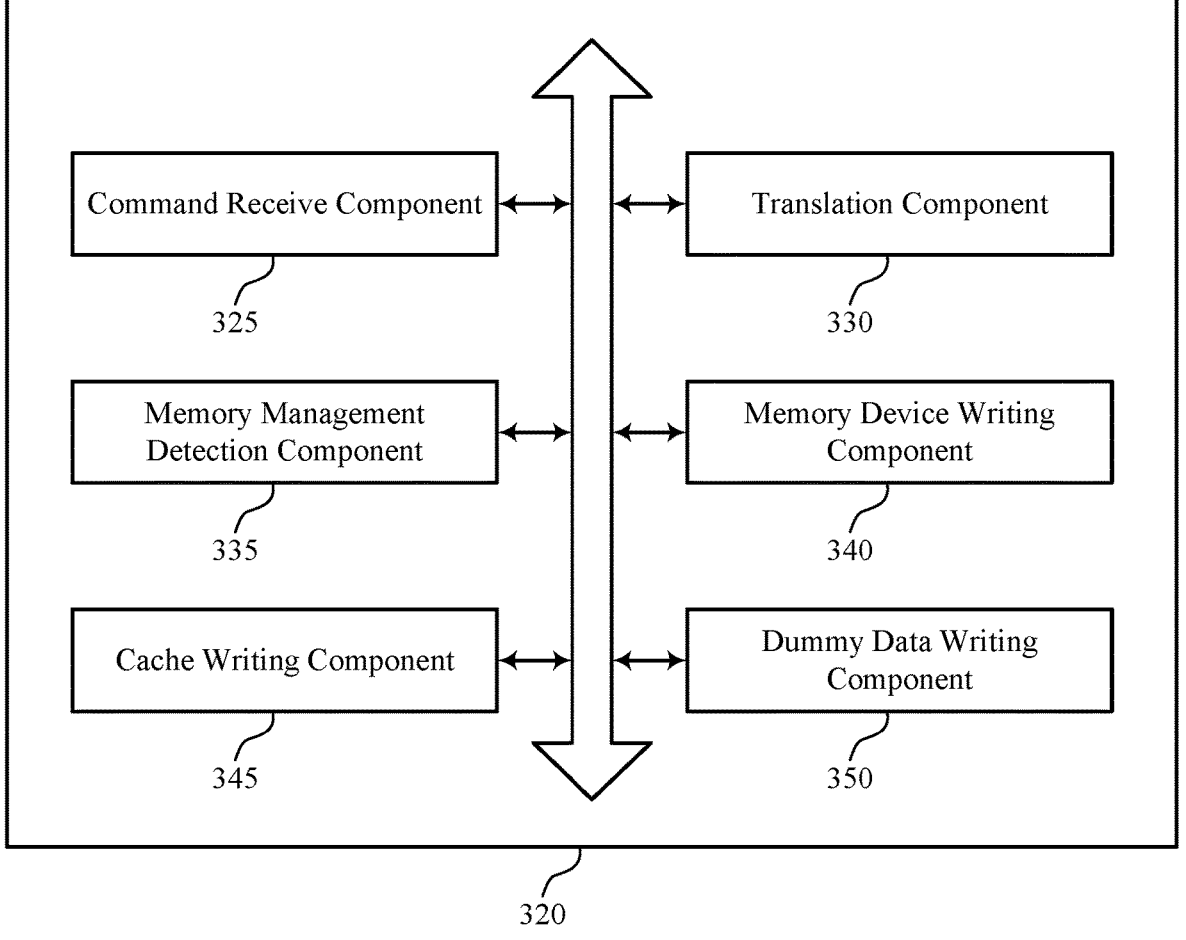
FIG. 3 shows a block diagram of a memory system that supports techniques for a fragment cursor in accordance with examples as disclosed herein.

FIG. 3 shows a block diagram 300 of a memory system 320 that supports techniques for a fragment cursor in accordance with examples as disclosed herein. The memory system 320 may be an example of aspects of a memory system as described with reference to FIGS. 1 through 2. The memory system 320, or various components thereof, may be an example of means for performing various aspects of techniques for a fragment cursor as described herein. For example, the memory system 320 may include a command receive component 325, a translation component 330, a memory management detection component 335, a memory device writing component 340, a cache writing component 345, a dummy data writing component 350, or any combination thereof. Each of these components may communicate, directly or indirectly, with one another (e.g., via one or more buses).

The command receive component 325 may be configured as or otherwise support a means for receiving a plurality of write commands, each write command associated with a data fragment of a plurality of data fragments. The translation component 330 may be configured as or otherwise support a means for storing the plurality of data fragments in a cursor based at least in part on receiving the plurality of write commands, the cursor configured to store data fragments with a size that is less than a fragment size threshold. The memory management detection component 335 may be configured as or otherwise support a means for detecting a memory management operation at the memory system after storing the plurality of data fragments. The memory device writing component 340 may be configured as or otherwise support a means for writing the plurality of data fragments to a block of memory cells of the memory system based at least in part on storing the plurality of data fragments in the cursor and detecting the memory management operation.

In some examples, to support storing the plurality of data fragments in the cursor, the cache writing component 345 may be configured as or otherwise support a means for writing the plurality of data fragments to a cache associated with the block of memory cells, where writing the plurality of data fragments to the block of memory cells is based at least in part on writing the plurality of data fragments to the cache.

In some examples, a second cursor is configured to store a second plurality of data fragments with a second size that is greater than the fragment size threshold. In some examples, the fragment size threshold includes a page or a portion of a page.

In some examples, the plurality of data fragments are written to the block of memory cells based at least in part on a mapping unit associated with the cursor. In some examples, the mapping unit includes a page, a block, or a portion of a page.

In some examples, the dummy data writing component 350 may be configured as or otherwise support a means for writing dummy data to the block of memory cells based at least in part on writing the plurality of data fragments to the block of memory cells. In some examples, the dummy data includes random logic states. In some examples, the dummy data writing component 350 may be configured as or otherwise support a means for programming a partial of a page to the block of memory cells instead of writing the dummy data.

In some examples, the memory management operation includes a power operation, a cache synchronization operation, a data relocation operation, or any combination thereof. In some examples, the block of memory cells includes static single level cells, dynamic single level cells, or both.

FIG. 4 shows a flowchart illustrating a method 400 that supports techniques for a fragment cursor in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally or alternatively, the memory system may perform aspects of the described functions using special-purpose hardware.

At 405, the method may include receiving a plurality of write commands, each write command associated with a data fragment of a plurality of data fragments. The operations of 405 may be performed in accordance with examples as disclosed herein. In some examples, aspects of the operations of 405 may be performed by a command receive component 325 as described with reference to FIG. 3.

At 410, the method may include storing the plurality of data fragments in a cursor based at least in part on receiving the plurality of write commands, the cursor configured to store data fragments with a size that is less than a fragment size threshold. The operations of 410 may be performed in accordance with examples as disclosed herein. In some examples, aspects of the operations of 410 may be performed by a translation component 330 as described with reference to FIG. 3.

At 415, the method may include detecting a memory management operation at the memory system after storing the plurality of data fragments. The operations of 415 may be performed in accordance with examples as disclosed herein. In some examples, aspects of the operations of 415 may be performed by a memory management detection component 335 as described with reference to FIG. 3.

At 420, the method may include writing the plurality of data fragments to a block of memory cells of the memory system based at least in part on storing the plurality of data fragments in the cursor and detecting the memory management operation. The operations of 420 may be performed in accordance with examples as disclosed herein. In some examples, aspects of the operations of 420 may be performed by a memory device writing component 340 as described with reference to FIG. 3.

In some examples, an apparatus as described herein may perform a method or methods, such as the method 400. The apparatus may include, features, circuitry, logic, means, or instructions (e.g., a non-transitory computer-readable medium storing instructions executable by a processor) for receiving a plurality of write commands, each write command associated with a data fragment of a plurality of data fragments, storing the plurality of data fragments in a cursor based at least in part on receiving the plurality of write commands, the cursor configured to store data fragments with a size that is less than a fragment size threshold, detecting a memory management operation at the memory system after storing the plurality of data fragments, and writing the plurality of data fragments to a block of memory cells of the memory system based at least in part on storing the plurality of data fragments in the cursor and detecting the memory management operation.

In some examples of the method 400 and the apparatus described herein, storing the plurality of data fragments in the cursor may include operations, features, circuitry, logic, means, or instructions for writing the plurality of data fragments to a cache associated with the block of memory cells, where writing the plurality of data fragments to the block of memory cells may be based at least in part on writing the plurality of data fragments to the cache.

In some examples of the method 400 and the apparatus described herein, a second cursor may be configured to store a second plurality of data fragments with a second size that may be greater than the fragment size threshold. In some examples of the method 400 and the apparatus described herein, the fragment size threshold includes a page or a portion of a page.

In some examples of the method 400 and the apparatus described herein, the plurality of data fragments may be written to the block of memory cells based at least in part on a mapping unit associated with the cursor. In some examples of the method 400 and the apparatus described herein, the mapping unit includes a page, a block, or a portion of a page.

Some examples of the method 400 and the apparatus described herein may further include operations, features, circuitry, logic, means, or instructions for writing dummy data to the block of memory cells based at least in part on writing the plurality of data fragments to the block of memory cells. In some examples of the method 400 and the apparatus described herein, the dummy data includes random logic states.

In some examples of the method 400 and the apparatus described herein, the memory management operation includes a power operation, a cache synchronization operation, a data relocation operation, or any combination thereof. In some examples of the method 400 and the apparatus described herein, the block of memory cells includes static single level cells, dynamic single level cells, or both.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device and a controller coupled with the memory device and configured to cause the apparatus to receive a plurality of write commands, each write command associated with a data fragment of a plurality of data fragments, store the plurality of data fragments in a cursor based at least in part on receiving the plurality of write commands, the cursor configured to store data fragments with a size that is less than a fragment size threshold, detect a memory management operation at the memory device after storing the plurality of data fragments, and write the plurality of data fragments to a block of memory cells of the memory device based at least in part on storing the plurality of data fragments in the cursor and detecting the memory management operation.

In some examples of the apparatus, the controller may be further configured to cause the apparatus to write the plurality of data fragments to a cache associated with the block of memory cells, where writing the plurality of data fragments to the block of memory cells may be based at least in part on writing the plurality of data fragments to the cache.

In some examples of the apparatus, a second cursor may be configured to store a second plurality of data fragments with a second size that may be greater than the fragment size threshold. In some examples of the apparatus, the fragment size threshold includes a page or a portion of a page.

In some examples of the apparatus, the plurality of data fragments may be written to the block of memory cells based at least in part on a mapping unit associated with the cursor.

In some examples of the apparatus, the mapping unit includes a page, a block, or a portion of a page.

In some examples of the apparatus, the controller may be further configured to cause the apparatus to write dummy data to the block of memory cells based at least in part on writing the plurality of data fragments to the block of memory cells. In some examples of the apparatus, the dummy data includes random logic states.

In some examples of the apparatus, the memory management operation includes a power operation, a cache synchronization operation, a data relocation operation, or any combination thereof. In some examples of the apparatus, the block of memory cells includes static single level cells, dynamic single level cells, or both.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
one or more controllers coupled with the one or more memory devices and configured to cause the memory system to:
receive a write command associated with a data of a first size;
detect a cache synchronization operation performed at the one or more memory devices;
store the data in a temporary cursor in a flash translation layer of the memory system in response to detecting the cache synchronization operation and based at least in part on the first size of the data, wherein the memory system is associated with the temporary cursor and a second cursor in the flash translation layer of the memory system, the second cursor and the temporary cursor configured to identify a set of memory cells of the one or more memory devices to write the data to, and wherein a mapping unit size of the temporary cursor in the flash translation layer is 8 kilobytes and a mapping unit size of the second cursor in the flash translation layer is 128 kilobytes;
write the data and a quantity of dummy data to the set of memory cells of the one or more memory devices from the temporary cursor based at least in part on detecting the cache synchronization operation and on identifying the set of memory cells, wherein the data written from the temporary cursor and the quantity of dummy data are based at least in part on the first size of the data and the mapping unit size associated with the temporary cursor being a portion of a page; and cease use of the temporary cursor based at least in part on a completion of the cache synchronization operation.

2. The memory system of claim 1, wherein, to store the data in the temporary cursor, the one or more controllers are further configured to cause the memory system to:

write the data to a cache associated with the set of memory cells, wherein writing the data to the set of memory cells is based at least in part on writing the data to the cache.

3. The memory system of claim 1, wherein the second cursor is configured to store data with sizes greater than a fragment size threshold.

4. The memory system of claim 3, wherein the fragment size threshold comprises a page or a portion of a page.

5. The memory system of claim 1, wherein the dummy data comprises random logic states.

6. The memory system of claim 1, wherein the set of memory cells comprises static single level cells, dynamic single level cells, or both.

7. A non-transitory computer-readable medium storing code comprising instructions which, when executed by a processor of an electronic device, cause the electronic device to:

receive a write command associated with a data of a first size;

detect a cache synchronization operation performed at one or more memory devices of a memory system;

store the data in a temporary cursor in a flash translation layer of the memory system in response to detecting the cache synchronization operation and based at least in part on the first size of the data, wherein the memory system is associated with the temporary cursor and a second cursor in the flash translation layer of the memory system, the second cursor and the temporary cursor configured to identify a set of memory cells of the one or more memory devices to write the data to, and wherein a mapping unit size of the temporary cursor in the flash translation layer is 8 kilobytes and a mapping unit size of the second cursor in the flash translation layer is 128 kilobytes;

write data and a quantity of dummy data to the set of memory cells of the one or more memory devices from the temporary cursor based at least in part on detecting the cache synchronization operation and on identifying the set of memory cells, wherein the data written from the temporary cursor and the quantity of dummy data are based at least in part on the first size of the data and the mapping unit size associated with the temporary cursor being a portion of a page; and cease use of the temporary cursor based at least in part on a completion of the cache synchronization operation.

8. The non-transitory computer-readable medium of claim 7, wherein, to store the data in the temporary cursor, the instructions, when executed by the processor of the electronic device, further cause the electronic device to:

write the data to a cache associated with the set of memory cells, wherein writing the data to the set of memory cells is based at least in part on writing the data to the cache.

9. The non-transitory computer-readable medium of claim 7, wherein the second cursor is configured to store data with sizes greater than a fragment size threshold.

10. The non-transitory computer-readable medium of claim 9, wherein the fragment size threshold comprises a page or a portion of a page.

11. The non-transitory computer-readable medium of claim 7, wherein the dummy data comprises random logic states.

12. The non-transitory computer-readable medium of claim 7, wherein the set of memory cells comprises static single level cells, dynamic single level cells, or both.

13. A method performed by a memory system, comprising:

receiving a write command associated with a data of a first size;

detecting a cache synchronization operation performed at one or more memory devices of the memory system;

storing the data in a temporary cursor in a flash translation layer of the memory system in response to detecting the cache synchronization operation and based at least in part on the first size of the data, wherein the memory system is associated with the temporary cursor and a second cursor in the flash translation layer of the memory system, the second cursor and the temporary cursor configured to identify a set of memory cells of the one or more memory devices to write the data to, and wherein a mapping unit size of the temporary cursor in the flash translation layer is 8 kilobytes and a mapping unit size of the second cursor in the flash translation layer is 128 kilobytes;

writing the data and a quantity of dummy data to the set of memory cells of the one or more memory devices from the temporary cursor based at least in part on detecting the cache synchronization operation and on identifying the set of memory cells, wherein the data written from the temporary cursor and the quantity of dummy data are based at least in part on the first size of the data and the mapping unit size associated with the temporary cursor being a portion of a page; and ceasing use of the temporary cursor based at least in part on a completion of the cache synchronization operation.

14. The method of claim 13, wherein storing the data in the temporary cursor comprises:

writing the data to a cache associated with the set of memory cells, wherein writing the data to the set of memory cells is based at least in part on writing the data to the cache.

15. The method of claim 13, wherein the second cursor is configured to store data with sizes greater than a fragment size threshold.

16. The method of claim 15, wherein the fragment size threshold comprises a page or a portion of a page.

* * * * *